No. 851,189. PATENTED APR. 23, 1907.
W. WAGNER.
POWER TRANSMISSION PULLEY.
APPLICATION FILED JUNE 8, 1906.
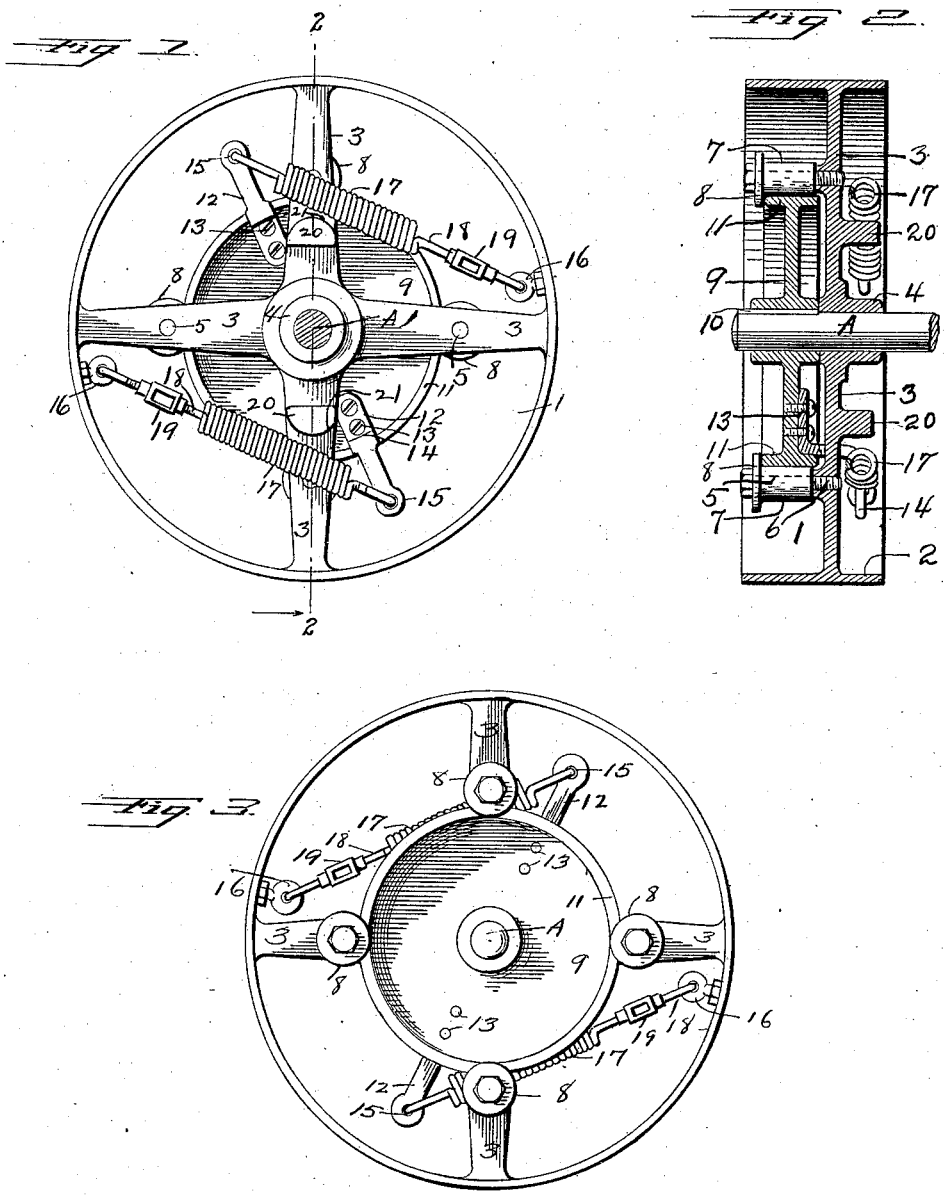

UNITED STATES PATENT OFFICE.

WILLIAM WAGNER, OF FORESTVILLE, MICHIGAN.

POWER-TRANSMISSION PULLEY.

No. 851,189.      Specification of Letters Patent.      Patented April 23, 1907.

Application filed June 8, 1906. Serial No. 320,838.

*To all whom it may concern:*

Be it known that I, WILLIAM WAGNER, a citizen of the United States, residing at Forestville, in the county of Sanilac and State of Michigan, have invented certain new and useful Improvements in Power-Transmission Pulleys, of which the following is a specification.

This invention relates to new and useful improvements in power transmission pulleys and specifically embodies a plurality of pulleys respectively loosely and rigidly mounted upon a common shaft, one pulley serving as a driving medium and the other serving to transmit the power from the first pulley, by virtue of novel connecting elements operatively joining the two pulleys, in their active and passive relation.

The primary object of the present invention is to provide a pulley designed for use with gas engine driven machinery, such as centrifugal separators, dynamos, etc. In this connection the invention particularly aims to provide an even and constant transmission of power, in which irregularities in the movement of the engine, due to untimely explosions and like causes will be compensated.

It is a further object of the invention to provide novel means for reducing friction between the pulleys in their operatively connected relation.

A further object of the invention resides in the provision a novel means for regulating the tension between the pulleys.

It is finally the object of the invention to provide a device of the type set forth which shall be simple and inexpensive to manufacture, strong and durable, and practical and efficient in use.

The detailed construction will appear in the course of the following description in which reference is had to the accompanying drawings forming a part of this specification, like numerals designating like parts throughout the several views, wherein Figure 1 is a side elevation of a power transmission pulley constructed in accordance with my invention. Fig. 2 is a vertical transverse section thereof on the line 2—2 of Fig. 1, and Fig. 3 is an elevation looking at the side opposite to that disclosed in Fig. 1.

In the practical embodiment of my invention I employ a shaft A which we will assume is the driven shaft by which the power is transmitted to a machine of the type above intimated. Loosely mounted upon the shaft A is a pulley 1 which is formed with a widened tread or periphery 2 for the reception of a drive belt. The pulley 1 is provided with integral spokes 3 uniting the tread 2 and the hub 4. Each of the spokes 3 carries a laterally extending post 5 indicated in dotted lines in Fig. 2 and having threaded connection with the respective spoke as at 6.

The posts 5 are arranged in annular series and are severally provided with friction rollers 7 formed at their ends with annular upstanding flanges 8 which engage the edge of a pulley 9 keyed upon the shaft A as at 10, and which serve as keepers to maintain the pulleys 1 and 9 in closely associated relation. The pulley 9 is formed with a widened tread 11 which bears in contacting relation upon the friction rollers 7. Mounted at diametrically opposite points upon the pulley 9 are radially extending arms 12 which have rigid connection therewith as at 13 and are offset and project beyond the periphery of the same as at 14. The arms 12 each terminate in an eye 15. Eye-bolts 16 are mounted at opposite points upon the pulley 1 and are designed to have connection with the adjacent arm 12 by means of retractile coil springs 17, which engage the eye 15 at one end and which are formed adjacent to the eye-bolt 16 with an extension 18 formed in sections, one of which engages the eye-bolt 16 and is united with the opposing section by a turn buckle 19 in a well known manner, which forms a means for adjusting the tension of the spring 17. The spring 17 yields under a heavy strain and for the purpose of preventing said spring from yielding to a point where a dead center would occur, projecting integral lugs 20 are formed upon the adjacent spoke 3. The lugs 20 are each formed with curved bearing faces 21 designed to present an anti-frictional surface to the spring 17 when the latter yields sufficiently under a heavy strain to contact therewith.

In practical use it will be readily apparent that power will be transmitted from the pulley 1 to the pulley 9 and in turn to the shaft A from which the machine is driven. In this operation the springs 17 will act with a direct and reactionary movement to compensate for vibration and inequalities in the speed of the engine, thus saving wear and tear upon the apparatus driven from the engine, and assuring a more effective transmission of power and consequently a more efficient operation.

While the elements herein shown and described are well adapted to serve the functions set forth, it is obvious that various minor changes may be made in the proportions, shape and arrangement of the several parts without departing from the spirit and scope of the invention as defined in the appended claims. Although I have described the shaft A as the driven shaft, it will be readily apparent that by changing the tension of the springs and other minor changes, the shaft A may be the drive shaft and that power may be transmitted to the pulley 2 from the pulley 9.

Having fully described my invention I claim:

1. The combination with a shaft, of a pulley rigidly mounted thereupon, a pulley loosely mounted thereupon and in a plane parallel to said first named pulley, resilient yieldable connections between said pulleys and flanged anti-friction rollers carried by and extending horizontally from the one pulley and overlying and positively engaging the tread of the opposing pulley.

2. The combination with a shaft, of a pulley rigidly mounted thereupon, a pulley loosely mounted thereupon and in a plane parallel to said first named pulley, keepers carried by the one pulley and overlying the tread of the opposing pulley, resilient yieldable connections between said pulleys, and means for varying the tension of said connections.

3. The combination with a shaft, of a pulley rigidly mounted thereupon, a pulley loosely mounted thereupon and in a plane parallel to said first named pulley, retractile coil springs forming a yieldable connection between said pulleys and having connection therewith at points adjacent to the periphery thereof, and means carried by said springs for adjusting the tension thereof.

In testimony whereof I affix my signature in presence of two witnesses.

WILLIAM WAGNER.

Witnesses:
LORETTO M. POTTS,
CHAS. N. POTTS.